United States Patent [19]

Cooper

[11] 4,043,315
[45] Aug. 23, 1977

[54] SOLAR HEAT COLLECTOR

[76] Inventor: Nathan E. Cooper, Brookside Drive, Woodbridge, Conn. 06525

[21] Appl. No.: 654,942

[22] Filed: Feb. 3, 1976

[51] Int. Cl.² .................................................. F24J 3/02
[52] U.S. Cl. ..................................... 126/270; 126/271
[58] Field of Search ................. 126/270, 271; 237/1 A

[56] References Cited

U.S. PATENT DOCUMENTS

| | | | |
|---|---|---|---|
| 1,093,498 | 4/1914 | Thring | 126/271 |
| 1,658,455 | 2/1928 | Metzech et al. | 126/271 |
| 1,951,403 | 3/1934 | Goddard | 126/271 |
| 3,262,493 | 7/1966 | Hervey | 126/271 |
| 3,466,119 | 9/1969 | Francia | 126/270 |
| 3,587,559 | 6/1971 | Nonaka | 126/271 |
| 3,934,573 | 1/1976 | Dandini | 126/270 |

Primary Examiner—Kenneth W. Sprague

[57] ABSTRACT

An omni-directional solar heat collector having a transparent, spherical outer shell, a spherical inner shell within the outer shell containing a plurality of light magnifying lenses spaced along the periphery thereof, and a plurality of heat collecting elements within said inner shell spaced from the magnifying lenses so that maximum light and heat intensity focuses upon said elements.

5 Claims, 7 Drawing Figures

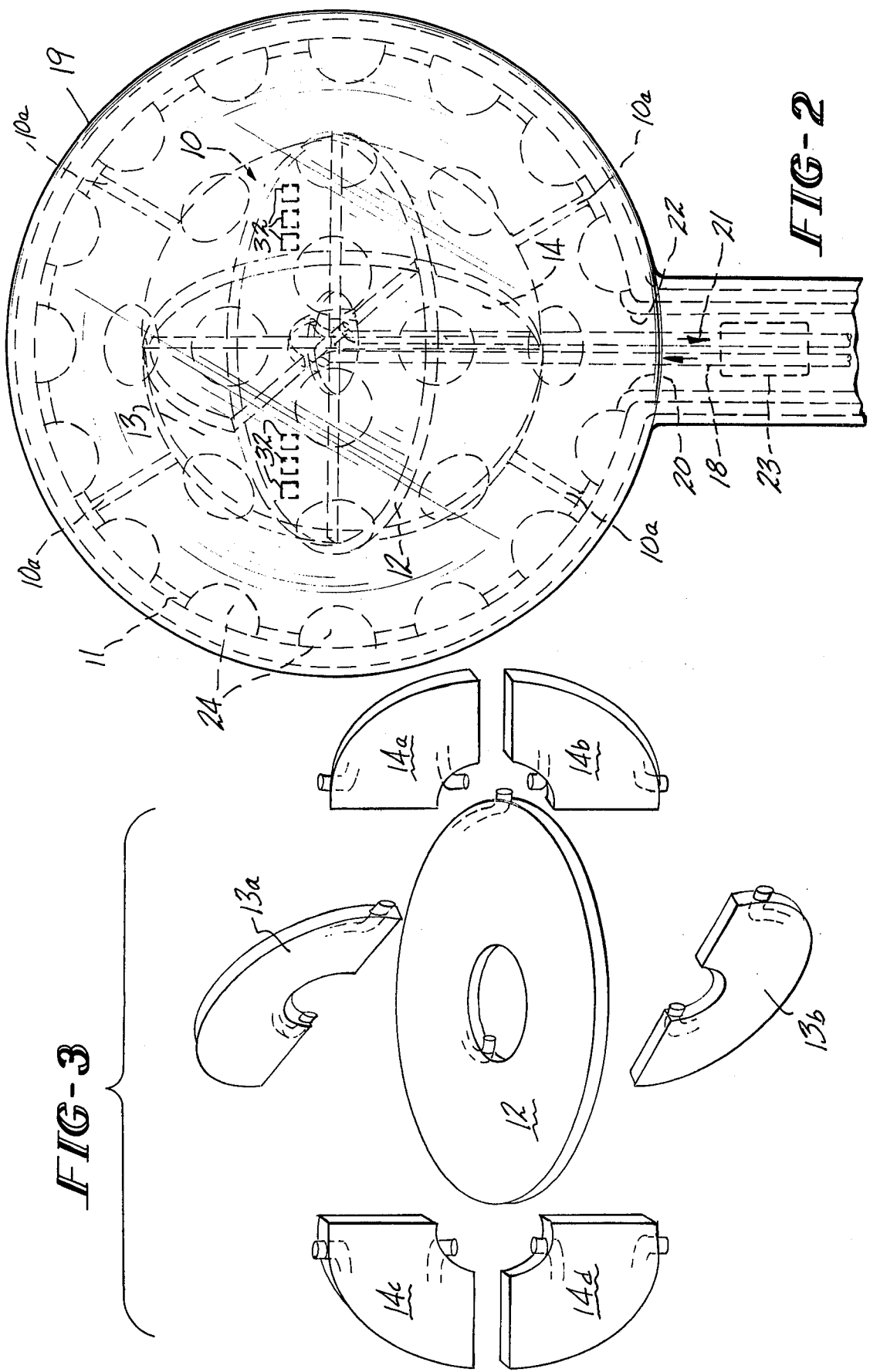

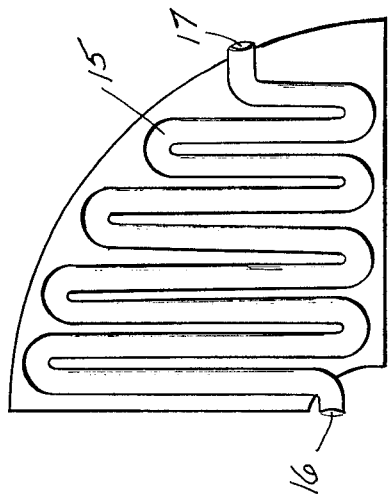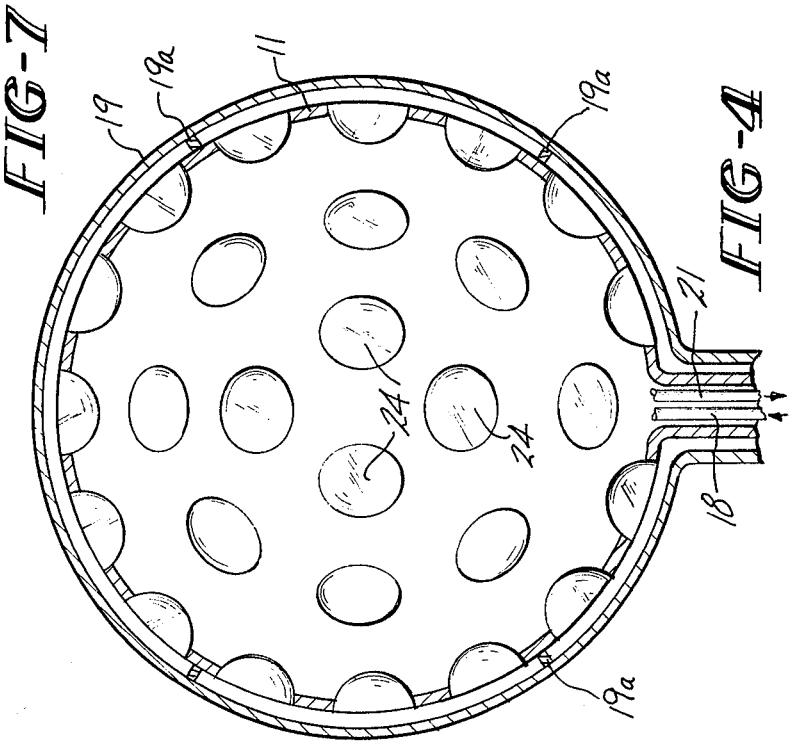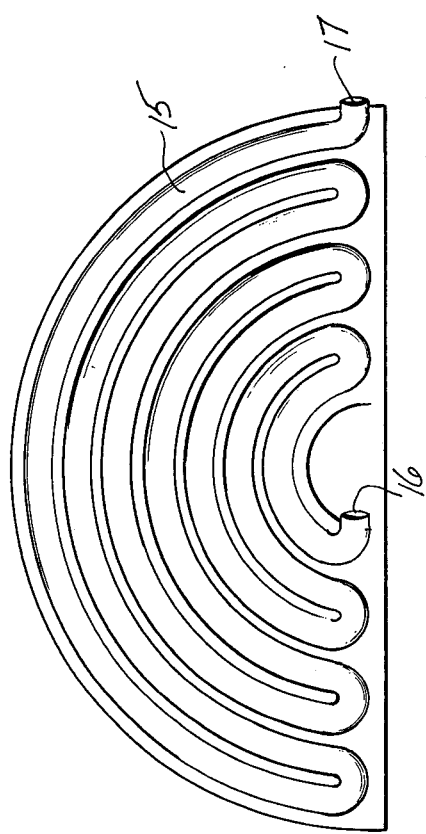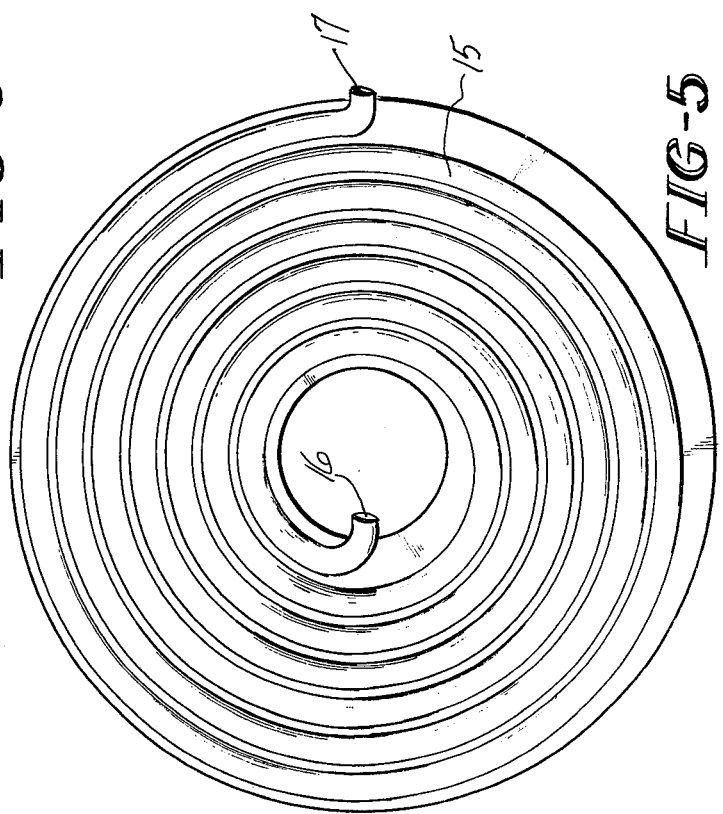

SOLAR HEAT COLLECTOR

BACKGROUND OF THE INVENTION

The art has developed many devices to extract thermal energy from solar energy or light. These devices are essentially collectors which are adapted to absorb the thermal component of the solar energy to heat an aqueous fluid. Without the use of some type of concentrator, however, the temperature to which the aqueous fluid can be raised is generally quite low, so that efficient use of the collected energy is not possible.

Prior art devices may conventionally require the use of a tracking mechanism in order to track the movement of the sun with changes of the time of day and season. These tracking mechanisms may be quite expensive, however, since they may require costly pivoting and rocking assemblies and also power for their operation, thereby further increasing overall cost. In addition, maintenance and repair costs are incurred particularly for moving parts. Still further, despite the foregoing, these conventional devices may not achieve sufficient efficiency to be commercially practicable.

Accordingly, it is a principal object of the present invention to provide an inexpensive and efficient solar heat collector.

It is a further object of the present invention to provide an inexpensive solar heat collector as aforesaid which does not require the use of expensive tracking mechanisms in order to provide efficient operation.

It is a still further object of the present invention to provide a solar heat collector as aforesaid which is omnidirectional, versatile and esthetically acceptable.

Further objects and advantages of the present invention will appear hereinbelow.

SUMMARY OF THE INVENTION

In accordance with the present invention the foregoing objects and advantages may be readily obtained and an inexpensive and efficient solar heat collector readily provided. The solar heat collector of the present invention comprises: a transparent, spherical outer shell; a spherical inner shell within said outer shell and spaced therefrom containing a plurality of light intensification means, such as a magnifying lenses, spaced along the periphery thereof; a plurality of heat collecting elements within said inner shell spaced from the magnifying lenses so that maximum light and heat intensity focuses upon said elements; and inlet and outlet headers communicating with said heat collecting elements and passing through said inner and outer shells for circulation of a heat transfer medium through said heat collecting elements. In the preferred embodiment magnification lenses are employed which are particularly effective in intensifying that portion of the spectrum having the highest heat intensity. The heat collecting elements should comprise a circuitous array of passageways to provide maximum surface for circulation of a heat transfer medium exposed to the magnified light rays, with said passageways being connected to a common inlet and outlet header communicating with inlet and outlet openings passing through the inner and outer shells. Preferably, the passageways are contained within a plurality of intersecting metal plates. In a preferred embodiment, a plurality of reflective surfaces are provided spaced from said outer shell for reflecting light rays upon said outer shell.

The solar heat collector of the present invention provides a great many significant advantages. The device is inexpensive and extremely efficient. The spherical shape is particularly desirable as it provides an omnidirectional device and enables exposure to light rays at virtually any angle of the sun. The high efficiency of the device enables its use without the necessity of expensive tracking mechanisms, although naturally these may be provided if desired. The placement of light and heat intensification means around the periphery of the sphere provides an especially efficient unit which is capable of generating extremely high temperatures in the heat transfer medium, e.g., 750° F. In addition, the device of the present invention is versatile, esthetically pleasing and readily adapted for installation on existing buildings.

BRIEF DESCRIPTION OF THE DRAWINGS

FIG. 2 is a partly schematic perspective view of the solar heat collector of the present invention showing the inner shell, outer shell and heat collecting elements;

FIG. 3 is an exploded, perspective view showing the heat collecting elements of the present invention;

FIG. 4 is a sectional view of the solar heat collector of the present invention showing the outer and inner shells;

FIGS. 5, 6 and 7 are plan views of the metal plates which comprise the heat collecting elements.

DETAILED DESCRIPTION

Figure 1:
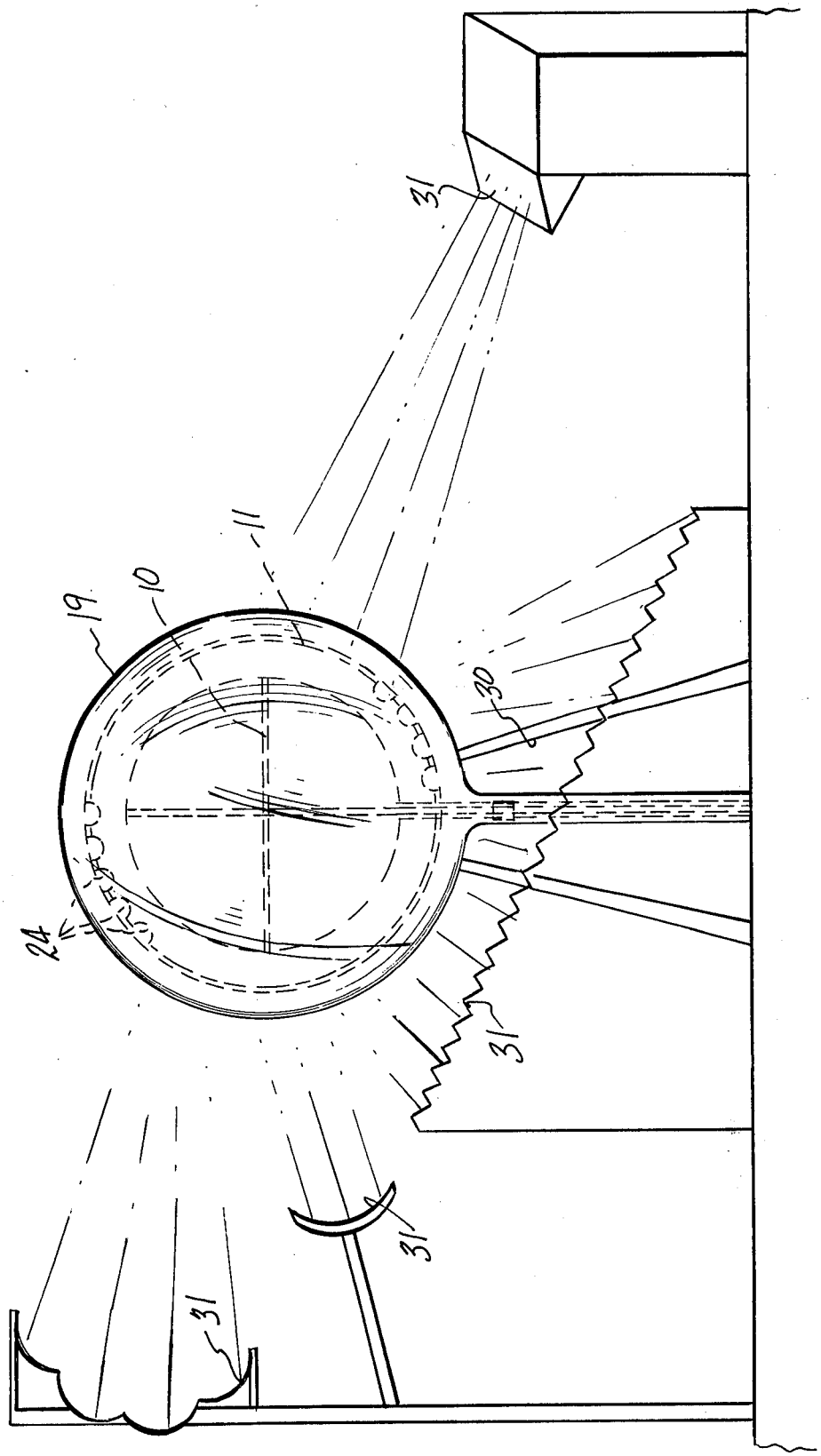
FIG. 1 is a side elevational view of a system constructed in accordance with the present invention.

Referring to FIGS. 1, 2 and 3, a plurality of heat collecting elements 10 are assembled within inner shell 11 comprising a plurality of intersecting metal plates 12, 13 and 14 placed perpendicular to each other so that the center of all plates, although they are on a separate plane, intersect at a common point. The heat collecting elements 10 may be assembled from a plurality of metal plate segments, such as circular plate 12, semi-circular plate segments 13a and 13b, and quadrant segments 14a, 14b, 14c and 14d assembled in any desired manner, as by welding or clamping, as shown in FIGS. 2 and 3, spaced from inner shell 11 as by support and spacing struts 10a. Each metal plate 12, 13 and 14 contains an internal passageway 15 having a passageway inlet 16 and a passageway outlet 17 for the circulation of a heat transfer medium as shown in FIGS. 5, 6 and 7. The passageways 15 may be prepared by methods known in the art, as by embossing or stamping two metal plates so that each plate contains half of the passageway, followed by clamping or welding the plates together to form the final plate. Other methods may of course be employed, as, for example, welding or otherwise attaching metal tubes to metal plates to provide the desired passageway configuration. The passageway outlets 17 are located centrally of each plate so that the heat transfer fluid follows a tortuous circuitous path. Passageway inlets 16 communicate with common inlet header 18 passing through inner shell 11 and outer shell 19 via inlet opening 20, and passageway outlets 17 communicate with common outlet header 21 passing through inner shell 11 and outer shell 19 via outlet opening 22 for introduction and circulation of a heat transfer medium through the heat collecting elements. If desired, the passageways may be connected in series so that the heat transfer medium passes through all of the coils. Alternatively, the heat exchange medium may be divided, as by baffles (not shown) so that a portion of the heat transfer medium passes through each coil.

A temperature sensing device 23 is provided communicating with inlet header 18 and outlet header 21 to regulate the flow of the thermal fluid by sensing the fluid outlet temperature and making the rate of fluid flow a function of the resultant outlet temperature. Naturally, pump means (not shown) are provided downstream of the inlet header.

While a particular embodiment of heat collecting elements has been shown, it should be understood that a variety of alternative embodiments may be used within the spirit of the present invention. It is, however, necessary to provide a circuitous array of passageways connected to an inlet and outlet header to provide a large exposure surface for the circulatory fluid. The present embodiment is particularly advantageous since between the curvature of the coils and the three planes employed, both direct beam or diffuse solar radiation from any angle will impinge upon some parts of the collector coils with a high degree of efficiency.

The collector coils 10 are surrounded by a transparent, spherical inner shell 1 containing a plurality of light intensification means, such as magnifying lenses 24, spaced along the periphery thereof for the purpose of concentrating solar radiation onto the heat collecting elements spaced therefrom. The heat collecting elements are spaced from the lenses so that maximum light and heat intensity focuses upon the elements, with exact distances depending of course upon the characteristics of the lenses, so that very high temperatures are developed in the heat transfer fluid, i.e. on the order of 750° F. - 900° F. The inner shell may be constructed of any suitable material, such as a rigid plastic.

A transparent, spherical outer shell 19 surrounds the inner shell 11, spaced therefrom as by optional spacers and support means 19a, to protect the lenses from damage. In addition, the inner and outer shells protect the collector coils and aid in prevention of loss of heat by re-radiation from the collector coils, thereby utilizing the maximum benefits of the "hot-house effect". Also the shells protect the collector coils from loss of heat by convection currents. The outer shell may be constructed of any suitable material, such as a rigid plastic.

If desired, a heated air stream may be utilized by the introduction of a controlled air flow through the spaces between the inner shell 11 and the heat collecting elements 10 in order to assist the heating process or, alternatively, to cool the collector assembly itself when such cooling is required.

The heat collector of the present invention may be erected on a stand or tower, as stand 30 shown in FIG. 1, to permit the collector to receive direct sunlight, diffuse sun light or reflected sunlight from a plurality of reflective surfaces 31 spaced from outer shell 19, such as mirrors or other reflective surfaces of mirror-like quality. Although these are not necessary for efficient operation, they would be helpful in developing maximum efficiency and insure a concentration of sufficient square footage of energy impingement to provide a particularly high BTU capacity. These reflective devices would include, but need not be limited to, highly reflective foil surfaces on roofs, walls or other available surfaces, an array of fixed concentrated solar beam reflective devices at an assorted mix of angles so that regardless of the sun's azimuth or direction sufficient reflected sunlight would be utilized. Concentrated stationary or sun-tracking mirrors could also be used.

The device of the present invention may be readily employed on a building or along side a building, in larger or smaller units or in a plurality of interconnected units. The device is capable of developing very high temperatures on the order of 750° F. - 900° F. even in northern climates. The device is versatile, light weight and esthetically pleasing and thus offers significant advantages.

Naturally, an aqueous heat transfer fluid may be employed, or ethyleneglycol or pressurized water. Preferably one employs organic materials capable of withstanding the high temperatures developed. The heated fluid may be supplied to any system in which heated fluid is utilized. For example, the heated fluid may be directed to heat exchangers to provide domestic or commercial heating or hot water, or for effecting refrigerative cooling or operating heat engines for electricity generation. Alternatively, an array of solar cells may be provided on the plate surfaces, as cells 32 in FIG. 2, for the generation of electricity in a known manner. Also, insulating means may be provided where appropriate, as around the inlet and outlet headers.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A solar heat collector comprising: a transparent, spherical outer shell; a spherical inner shell within said outer shell and spaced therefrom containing a plurality of light intensification means spaced along the periphery thereof; a plurality of heat collecting elements within said inner shell spaced from the light intensification means; and inlet and outlet headers communicating with said heat collecting elements and passing through said inner and outer shells for circulation of a heat transfer medium through said heat collecting elements, wherein said heat collecting elements comprise a circuitous array of passageways contained within a plurality of metal plates intersecting within said inner shell, said passageways being connected to a common inlet and outlet header.

2. A collector according to claim 1 wherein said light intensification means are magnifying lenses and wherein the heat collecting elements are spaced from the magnifying lenses so that maximum light and heat intensity focuses upon said elements.

3. A collector according to claim 1 wherein said passageways are contained in three circular plates perpendicular to each other and intersecting at a common point centrally of said inner shell, wherein each plate is in a separate plane.

4. A collector according to claim 1 including a plurality of reflective surfaces spaced from said outer shell for reflecting light rays upon said outer shell.

5. A collector according to claim 1 including a temperature sensing device communicating with the inlet and outlet headers for regulating the flow of the heat transfer medium through the heat collecting elements.

* * * * *